April 2, 1968 G. H. FREIER 3,376,044

RECORD CHANGER SPINDLE

Filed May 4, 1965 3 Sheets-Sheet 1

Inventor
Gerald H. Freier
By Brown, Jackson,
Boettcher & Dienner Att'ys.

Inventor
Gerald H. Freier
By Brown, Jackson, Boettcher and Dienner Att'ys.

RECORD CHANGER SPINDLE

Filed May 4, 1965

Inventor
Gerald H. Freier
By Brown, Jackson,
Boettcher & Dienner Att'ys.

1

3,376,044
RECORD CHANGER SPINDLE
Gerald H. Freier, Benton Harbor, Mich., assignor to V-M Corporation, Benton Harbor, Mich., a corporation of Michigan
Filed May 4, 1965, Ser. No. 453,164
6 Claims. (Cl. 274—10)

ABSTRACT OF THE DISCLOSURE

Record changer spindle having fingers which support a stack of records on the upper end of the spindle and move downwardly with operation of an actuator to carry the bottom record of the stack to the turntable. The spindle has an expandable cap which slidably seats over the upper end of the spindle and is spring biased so that it moves downwardly with the actuator to expand its lower ends on a sloping portion of the spindle wall and so that the cap supports the other records in the stack. On the return stroke of the actuator it raises the fingers to the bottom record of the stack to take the weight of the stack off the cap whereupon a further spring acts to raise the cap and relocate it for the next record change cycle.

The present invention relates to a center spindle for a phonograph record changer. More specifically, the invention is concerned with a center spindle of the self-supporting type and relates in particular to a record holding top assembly for such a spindle.

A self-supporting record changer spindle is provided with primary record supporting means generally in the form of a plurality of supporting fingers which normally project outwardly through slots in a spindle body to support a stack of records on an upper storage portion of the spindle without need for an overlying support arm or the like in order to stabilize the record stack. Such primary supporting fingers are associated with a finger carrier which is vertically movable within the spindle body, the finger carrier being movable downwardly to cause downward movement of the supporting fingers and eventual retraction thereof into the spindle body to release the bottom record in the stack to a turntable for playing.

In one type of self-supporting spindle, the supporting fingers are retracted after a short downward stroke in order to drop the bottom record to the turntable, such retraction being caused by engagement of the fingers with the lower ends of the respective slots through which they project. In accordance with a preferred embodiment, as described hereinbelow in conjunction with the present invention, the supporting fingers remain extended as they move downwardly until they reach the approximate level of the turntable. With the latter arrangement, the supporting fingers transport the lowermost record in the stack in a controlled manner substantially the entire distance to the turntable before the fingers are retracted to release the record.

It is well known in the art to provide a self-supporting center spindle with secondary record supporting means comprising a record holding top assembly at the upper storage portion of the spindle. Such secondary record supporting means is normally in an inoperative or non-gripping position so that a stack of records may be freely mounted over the upper storage portion of the spindle and supporting on the primary record supporting fingers. However, the secondary record supporting means is actuated to an operative record gripping position at the beginning of a record change cycle so as to support all but the bottom record in the stack when the latter record is lowered to the turntable for playing.

2

It is an object of the present invention to provide a record changer center spindle of the self-supporting type having an improved record holding top assembly or secondary supporting means for retaining all but the lowermost record of a stack on an upper storage portion of the spindle when the latter record is lowered to a turntable for playing.

A more specific object of the invention is to provide a record holding top assembly as last above-mentioned which is spring loaded toward its operative record holding position and is normally held in its inoperative non-gripping position by means which moves vertically with the primary supporting fingers.

Another object of the invention is to provide a record holding top assembly which is self-energizing in the sense that when in an operative position the weight of the record stack being supported will itself tend to force the gripping means of the top assembly into gripping engagement with the next-to-lowermost record in the stack.

A further object of the invention is to provide a record top holding assembly comprising a record gripping cap member and an associated actuating stem which are yieldably movable relative to one another for the purpose of permitting the primary supporting fingers to be moved upwardly into engagement with the underside of the record stack after lowering a record to the turntable whereby the weight of the remaining stack may be transferred from the record holding top assembly to the primary record supporting fingers without the necessity of dropping the record stack a distance equal to the thickness of one record.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of the invention.

In the drawings:

FIGURE 1 is a fragmentary elevational view of a self-supporting record changer center spindle embodying a record holding top assembly constructed in accordance with the present invention, the components being shown in their normal at rest positions wherein a stack of records is disposed on an upper storage portion of the spindle and supported thereon by a plurality of primary record supporting fingers;

Figures 6, 7, 8:
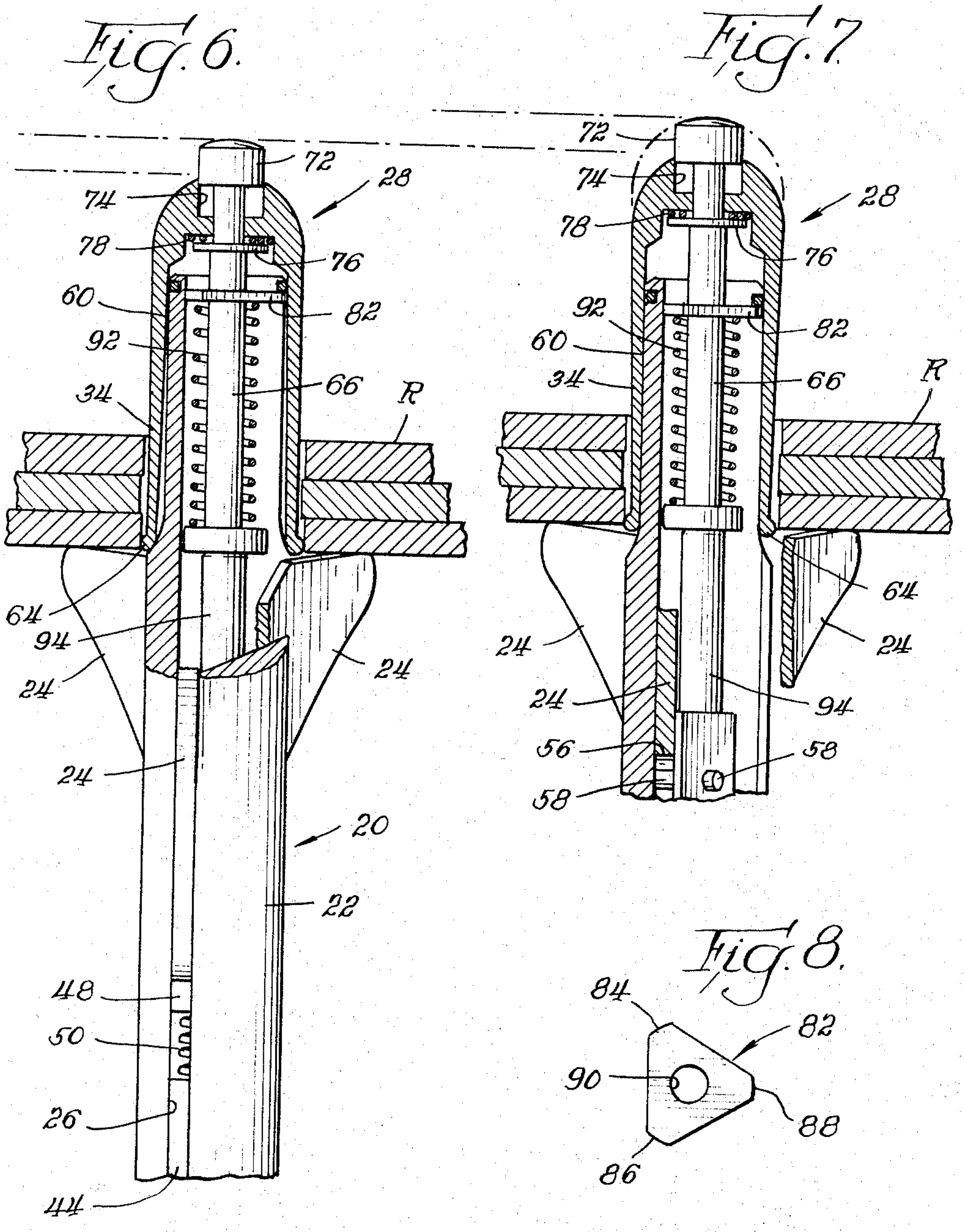

FIGURE 6 is a fragmentary view, partly in elevation and partly in vertical section, showing the primary supporting fingers after being raised to supporting engagement with the remaining record stack, and illustrating the manner in which a record gripping cap member and associated cap stem are yieldably movable relative to one another to permit such a further upward stroke of the primary supporting fingers;

FIGURE 7 is a fragmentary vertical sectional view similar to FIGURE 6 illustrating further upward movement of the primary record supporting fingers in order to lift the entire record stack together with the record gripping cap member thereby causing the cap member to release its grip on the records which are once again supported soley by the primary supporting fingers; and FIGURE 8 is a detail top plan view of a spring retainer member which comprises one component of the record holding top assembly.

Figure 1:
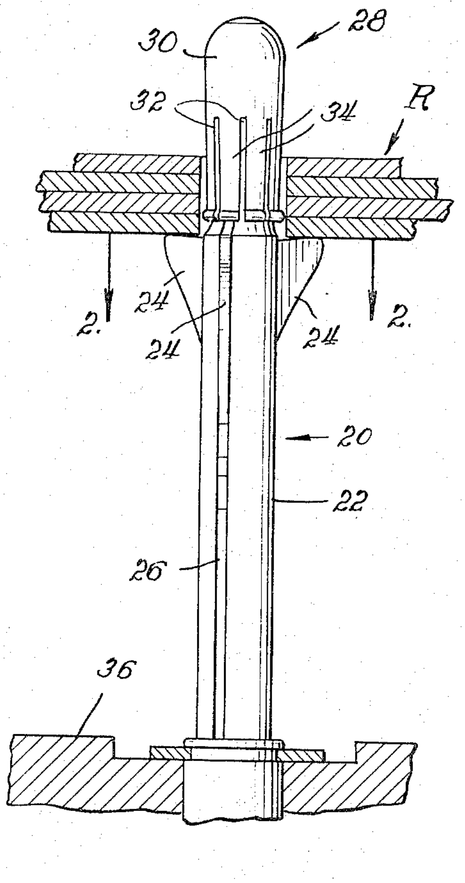

Referring now to the drawings, FIGURE 1 shows a self-supporting center spindle 20 comprising a spindle body 22, three primary record supporting fingers 24 which project outwardly through corresponding vertical slots 26 in the spindle body, and a record holding top assembly 28 including a thin-walled cap 30 which is provided with spaced vertical slots 32 so as to define six downwardly extending flexible record gripping fingers 34. A plurality of records R are supported on an upper storage portion of the spindle 20 for lowering one-by-one a turntable 30 for playing.

Figure 3:
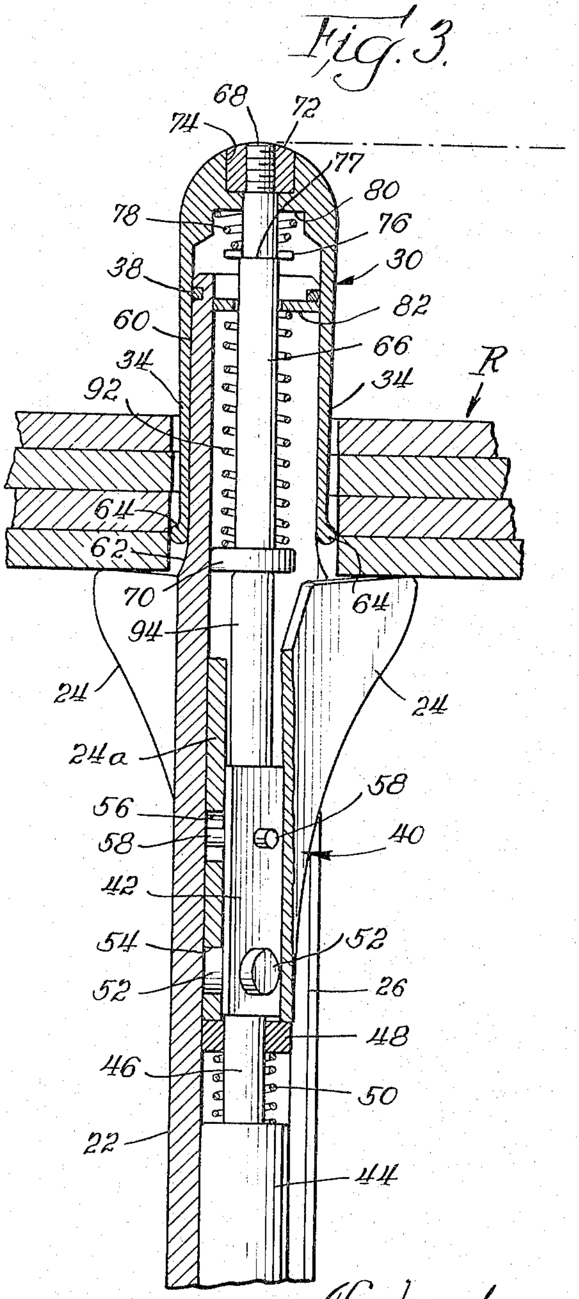
FIGURE 3 is an enlarged fragmentary vertical sectional view of the record changer spindle of FIGURE 1 showing a plurality of primary record supporting fingers in operative positions to support a stack of records on the upper storage portion of the spindle and showing secondary supporting means comprising a record holding top assembly in its normal inoperative or non-gripping position.

In the particular embodiment being described, the slots 26 in the spindle body 22 extend downwardly substantially the entire distance to the level of the turntable 36, and thus when the primary supporting fingers 24 are moved downwardly they will not be retracted into the spindle body until a record being lowered thereon has reached the turntable. In this manner, a record to be played is lowered in a controlled manner the entire distance to the turntable, rather than dropped thereto, and when the record has reached the turntable the fingers 24 are retracted to release the record. As shown in FIGURE 3, the vertical slots 26 also extend upwardly to the extreme upper end of the spindle body 22 where a snap ring 38 is positioned in an external annular groove in the segmented spindle body for holding the segments thereof in proper spaced relation.

Figure 2:
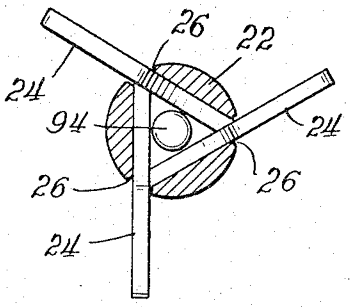
FIGURE 2 is an enlarged horizontal sectional view taken substantially along the line 2–2 of FIGURE 1 showing the manner in which three primary record supporting fingers project outwardly through respective vertical slots in the spindle body.

FIGURE 3 shows a finger carrier assembly 40 comprising an upper three-sided member 42 on which the three fingers 24 are mounted, and a lower rod portion 44. Intermediate the upper and lower carrier portions 42 and 44 there is a reduced diameter rod section 46 on which a collar 48 is vertically slidable, and the collar is yieldingly urged upwardly by a compression spring 50 which encompasses the reduced rod section 46 and is disposed beneath the collar. By way of example, a supporting finger **24*a* is pivotally mounted on a stud 52 which projects from one side of the carrier portion 42. The finger 24*a* is provided with an opening 54 to receive the stud 52, and is further provided thereabove with a second opening 56 into which a smaller diameter stud 58 projects from the finger carrier 42. The stud 58 serves as a stop to limit the outward pivotal movement of the supporting finger 24*a*. It will be understood that each of the supporting fingers 24 is pivotally mounted on a corresponding side of the carrier member 42 in the manner described above with respect to the finger 24*a*. In the embodiment described, the fingers 24 are mounted in respective planes which are each spaced from and parallel to the axis of the spindle body 22 as shown in FIGURE 2. The primary supporting fingers 24 are yieldingly urged toward their outermost pivotal positions of FIGURES 1 and 2 by the slidable collar 48 which is biased upwardly against the undersides of the fingers by the spring 50. For a more complete description of the structure and operation of the supporting fingers 24**, reference should be had to the copending application of Gerald H. Freier, Ser. No. 445,381, filed Apr. 5, 1965, which application is assigned to the assignee of the present invention.

Spindle actuating mechanism (not shown) is provided in order to move the carrier 42 and primary supporting fingers 24 downwardly to lower a record to the turntable 36 for playing, and thereafter for moving the supporting fingers upwardly again once the record has been released to the turntable. One suitable from of actuating mechanism comprises a train of steel balls disposed within the spindle body 22 beneath the carrier rod portion 44, together with a cam-actuated bellcrank lever which acts on the last ball for pushing the balls up into the spindle body to raise the fingers 24 and for permitting the balls to fall downwardly in the spindle body to lower the fingers 24. Spindle actuating mechanism of the foregoing type is fully described in the copending application of Robert J. Hammond, Ser. No. 449,533, filed Apr. 20, 1965, and assigned to the assignee of the present invention.

Figures 4, 5:
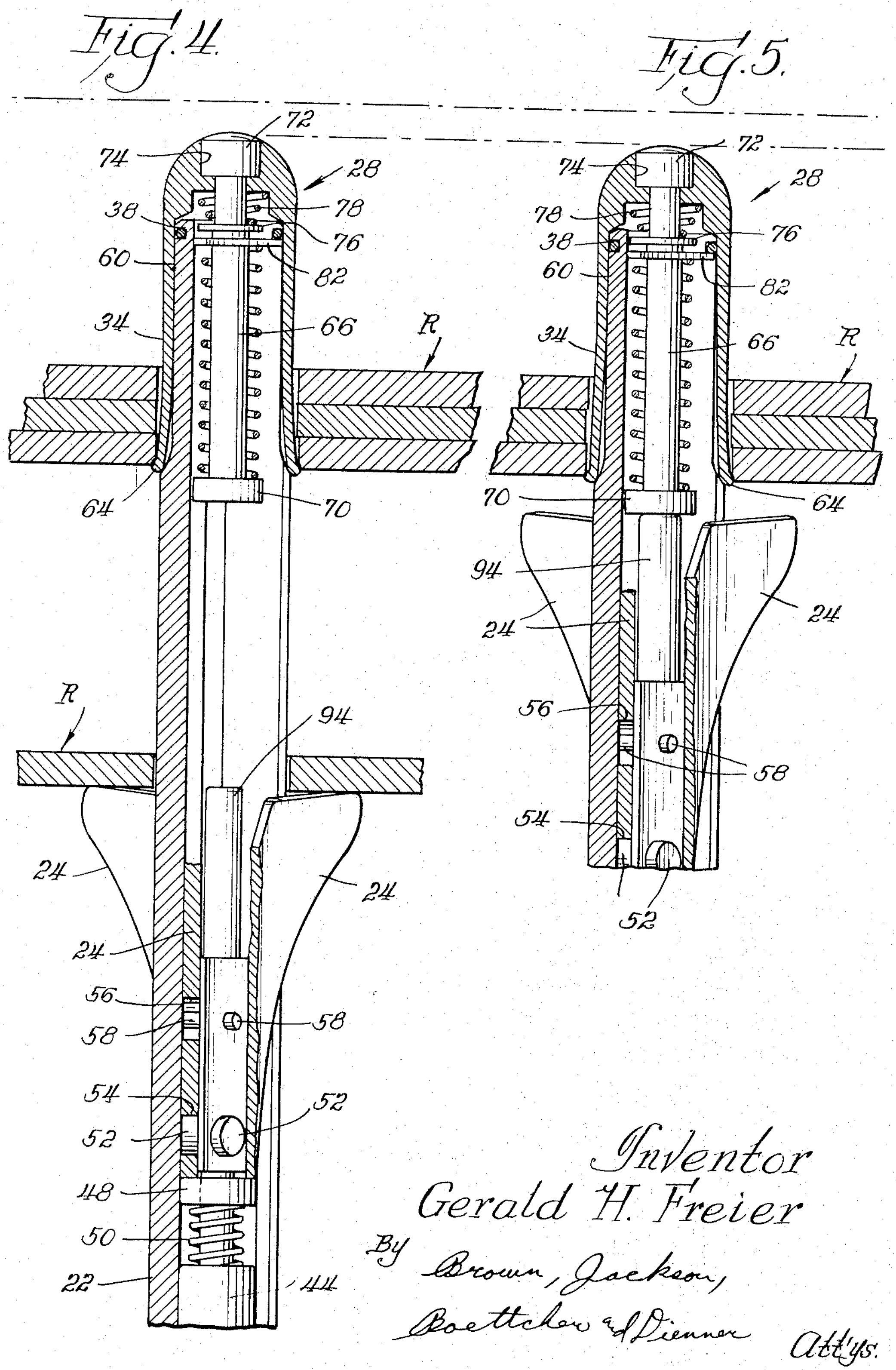
FIGURE 4 is a view similar to FIGURE 3 showing the primary record supporting fingers in a lowered position as when lowering the bottom record to a turntable for playing, and showing the record holding top assembly in an operative record gripping position to support the remainder of the record stack on the upper storage portion of the spindle.
FIGURE 5 is a fragmentary vertical sectional view similar to FIGURE 3 showing the primary record supporting fingers subsequent to the lowering of a record to the turntable for playing and after being returned to the position of FIGURE 3, there being shown a space between such fingers and the record stack due to the absence of the record previously released to the turntable.

The record holding top asembly 28 of the present invention will now be described. The cap 30 is positioned over the upper end of the spindle body 22 and is vertically movable thereon between an upper inoperative or non-gripping position as shown in FIGURE 3 and a lower operative record gripping position as shown in FIGURE 4. When the cap 30 is in its upper position the resilient gripping fingers 34 lie radially inwardly against an upper reduced diameter section 60 of the spindle body 22 so as not to grip any of the records R which are supported on the upper storage portion of the spindle by the primary supporting fingers 24. When the cap 30 is moved downwardly to the position of FIGURE 4, the resilient fingers 34 engage an outwardly sloping portion 62 of the spindle body 22, whereby the lower ends of the fingers are cammed outwardly causing rib portions 64 thereon to firmly engage against the centerhole edge of the next-to-lowermost record in the stack. In this manner, the resilient fingers 34 serve to support all but the lowermost record on the upper storage portion of the spindle, whereby the latter record may be lowered to the turntable for playing. The cap 30 is self-energizing in the sense that the weight of the record stack R tends to wedge the lower ends of the resilient fingers 34 downwardly onto the tapered section 62 of the spindle body, thereby causing the fingers to be forced outwardly into gripping engagement with the next-to-lowermost record. Thus, the greater the weight of the record stack, the more firmly the fingers 34 will be wedged into their operative gripping positions.

The cap 30 is provided with a cap stem 66 which has a threaded upper end 68 and an enlarged head 70 at the lower end thereof. A collar 72 is positioned in a recess 74 formed in the top of the cap 30, and the upper end 68 of the cap stem is threaded into the collar 72. It will be understood that with the components positioned as in FIGURE 3 with the collar 72 seated in the bottom of the recess 74, the cap stem 66 cannot move downwardly relative to the cap 30, but it is capable of upward movement relative to the cap as shown in FIGURE 6. A C-washer 76 is mounted on the cap stem 66 toward the upper end thereof so as to bear downwardly against a shoulder 77, and a conical compression spring 78 is positioned on the cap stem with its smaller lower end bearing against the C-washer 76 and its larger upper end bearing against an annular shoulder 80 formed inside the upper end of the cap 30. The conical compression spring 78 thus urges the cap 30 upwardly relative to the cap stem 66 to the limiting relative position where the collar 72 is seated in the recess 74 as in FIGURE 3. Because the cap 30 is spring loaded upwardly by the spring 78, no wedging or gripping of records will occur when a record stack is manually loaded on the upper end of the spindle. It will also be noted that for a predetermined at rest position of the cap stem 66, it is possible to adjust the position of the cap 30 by threading the collar 72 upwardly or downwardly on the upper stem end 68. Such adjustability is desirable since the gripping ribs 64 on the resilient fingers 34 must be accurately spaced a predetermined distance above the tops of the primary supporting fingers 24 when the latter are also in their at rest positions.

FIGURE 8 shows a generally triangular spring retainer plate 82 having three projecting leg portions 84, 86 and 88, and a central aperture 90, the latter comprising a clearance hole for the cap stem 66. Referring again to FIGURE 3, the spring retainer plate 82 is disposed within the upper end of the spindle body 22 immediately beneath the snap ring 38 so that the three leg portions 84, 86 and 88 project into the three vertical slots 26 and thereby underlie the snap ring. In this manner, the spring retainer 82 is held within the upper end of the spindle body 22 and prevented from moving upwardly relative thereto. A compression spring 92 is positioned over the cap stem 66 with its lower end bearing against the enlarged head 70 and its upper end bearing against the retainer plate 82. The spring 92 is thus anchored at its upper end relative to the spindle body 22, and its lower end urges downwardly on the cap stem 66 and on the cap 30. The cap stem 66 and cap 30 are normally maintained in the upper positions shown in FIGURE 3 due to a rod 94 which projects upwardly from the top of the finger carrier 42 and engages against the underside of the head 70, thereby holding the cap 30 in its upper inoperative or non-gripping position. However, it will be understood that whenever the finger carrier assembly 40 is moved downwardly so as to withdraw the rod 94, the spring 92 will force the cap stem 66 downwardly, and the latter in turn will pull the cap 30 downwardly to the position of FIGURE 4 causing the resilient fingers 34 to ride out on the tapered spindle body section 62 and engage firmly against the centerhole edge of the next-to-lowermost record in the stack of records R disposed on the upper storage portion of the spindle.

The operation of the record holding top assembly 28 of the present invention will now be described with reference to FIGURES 3–7. FIGURE 3 shows the components in their normal positions wherein the primary record supporting fingers 24 are extended outwardly through the slots 26 in the spindle body 22 so as to support the stack of records R on the upper storage portion of the spindle. The rod 94 which projects upwardly from the finger carrier 42 is in engagement with the head 70 on the cap stem 66 so as to maintain the latter in an upper position against the force of the compression spring 92. Thus, the position of the rod 94 determines the position of the cap stem 66, and the conical spring 78 urges the cap 30 upwardly relative to the cap stem 66 to its uppermost relative position wherein the adjustable collar 72 is seated at the bottom of the recess 74. In the latter position of the cap 30, the resilient fingers 34 lie radially inwardly against the reduced diameter spindle body section 60, and thus the ribs 64 at the lower finger ends do not grip the centerhole edge of the record adjacent thereto.

When a record is to be lowered to the turntable for playing, the finger carrier assembly 40 including the rod 94 and the primary supporting fingers 24 is moved downwardly as indicated in FIGURE 4 by an actuating mechanism which does not form a part of the present invention and is not described herein. As soon as the rod 94 is withdrawn from beneath the cap stem head 70, the compression spring 92 yieldingly forces the cap stem 66 downwardly, and the stem 66 pulls the cap 30 downwardly causing the lower ends of the resilient fingers 34 to ride out on the tapered spindle body section 62. Thus, the rib portions 64 at the lower ends of the fingers 34 are wedged between the spindle body section 62 and the centerhole edge of the next-to-lowermost record in the stack of records R disposed on the upper storage portion of the spindle. Accordingly, the entire record stack except for the bottom record thereof is supported by the cap fingers 34, and at the same time the head 70 supports the spindle body 22 and prevents the segments thereof from collapsing under the wedging forces which are created.

The primary supoprting fingers 24 are moved downwardly and eventually retracted when they reach the level of the turntable in order to release the bottom record from the stack to the turntable for playing, and thereafter the fingers 24 are raised again toward their upper positions so that they will again support the record stack. When the finger carrier assembly 40 reaches the position where the rod 94 will again contact the stem head 70 as shown in FIGURE 5, the tops of the fingers 24 will still be spaced from the record stack due to the absence of the record which was previously lowered. Thus, it is necessary to lower the remaining record stack relative to the cap 30 by a distance approximately equal to the thickness of one record. However, while it is common with conventional spindle mechanisms to actually drop the remaining stack by such a distance, the mechanism described herein provides such relative movement without the necessity for dropping the stack. Accordingly, the finger carrier assembly 40 continues its upward movement after reaching the position of FIGURE 5, and thus the rod 94 pushes upwardly on the cap stem 66 causing compression of the conical spring 78. The weight of the record stack R causes the cap 30 to remain in its lower position, while the upward force on the cap stem 66 raises the latter by compressing the spring 78 until the position of FIGURE 6 is reached where the spring 78 is fully compressed and upward movement of the cap stem 66 relative to the cap 30 is no longer possible. It will be seen that the above-described upward movement of the stem 66 relative to the cap 30 causes the collar 72 to move partially out of the recess 74 in the top of the cap. It will further be seen that such relative movement permits the primary supporting fingers 24 to move into engagement with the bottom of the record stack R as shown in FIGURE 6.

Continued upward movement of the finger carrier 42 and rod 94, after the position of FIGURE 6 is reached, causes simultaneous upward movement of both the cap 30 and the record stack R. When such simultaneous upward movement is initiated, the record stack is supported both by the resilient fingers 34 and the primary supporting fingers 24. However, when the cap 30 reaches the position of FIGURE 7, the resilient fingers 34 will again lie in radially retracted positions against the reduced diameter spindle section 60, thereby causing the fingers 34 to release their grip on the adjacent record, whereby the record stack is once again supported on the primary supporting fingers 24. It is important to note that once the cap 30 has been raised sufficiently to cause retraction of the fingers 34, the cap 30 will no longer be held downwardly in a wedging relationship with the record stack. Thus, the cap 30 will be snapped upwardly relative to the cap stem 66 by the force of the conical spring 78 until the collar 72 is again seated in the bottom of the cap recess 74. The upward snapping movement of the cap 30 raises the latter to a position represented in dash lines in FIGURE 7. Thereafter, the finger carrier assembly 40 including the rod 94 is moved downwardly a distance approximately equal to the thickness of one record, whereby all of the components are again disposed in their original at rest positions as illustrated in FIGURE 3.

It should be understood that the record holding top assembly of the present invention may be used in conjunction with primary record supporting means other than the supporting fingers 24 described herein, and the present invention is not limited for use with record lowering mechanism which lowers a record in a controlled manner the entire distance to the turntable. Accordingly, while I have illustrated my invention in a preferred form, I do not intend to be limited to that form, except insofar as the appended claims are so limited, since modifications coming within the scope of my invention will be readily suggested to others with my disclosure before them.

I claim:

1. In a record changer spindle of the type having primary record supporting means which normally supports a stack of records on an upper storage portion of the spindle and which may be withdrawn to an inoperative position to release the lowermost record in the stack to a turntable for playing, the improvement comprising secondary record supporting means for supporting the remaining stack of records on the upper storage portion of the spindle when the primary record supporting means is withdrawn to release the lowermost record, said secondary record supporting means including, in combination, a body of said spindle having an open upper end cap means mounted over the upper end of said spindle body and vertically slidable thereon, said cap means having a lower end which is radially expandable for supporting a record on the upper storage portion of said spindle, said spindle body having outwardly sloping means for expanding said cap means to a record supporting position when the latter is moved downwardly on said spindle body, a cap stem having an upper end connected to said cap means and projecting downwardly therefrom through said open end of the spindle body, the lower end of said cap stem having an enlarged head which slidably engages about the inner wall of said spindle body adjacent said sloping means, a compression spring disposed within said spindle body about said cap stem having an upper end fixed relative to said spindle body adjacent the upper end thereof and a lower end engaged against said cap stem head for biasing said cap stem downwardly so as to bias said cap toward its lower operative position, and an actuator normally engaging said enlarged head to resist said biasing of the compression spring so as to hold said cap means out of its operative position, said actuator being moved downwardly away from said enlarged head of the cap stem upon withdrawing of the primary record supporting means to release the lowermost record.

2. In a record changer spindle of the type having primary record supporting means which normally supports a stack of records on an upper storage portion of the spindle and which may be withdrawn to an inoperative position to release the lowermost record in the stack to a turntable for playing, the improvement comprising secondary record supporting means for supporting the remaining stack of records on the upper storage portion of the spindle when the primary record supporting means is withdrawn to release the lowermost record, said secondary record supporting means including, in combination, a body of said spindle having an upper end, cap means mounted over the upper end of said spindle body and vertically slidable thereon, said cap means having a lower end which is radially expandable for supporting a record on the upper storage portion of said spindle, sloping means associated with said spindle body for expanding said cap means to a record supporting position when the latter is moved downwardly on said spindle body, a cap stem having an upper end connected to said cap means so that the cap means moves downwardly therewith, said cap stem being vertically movable a limited amount in the opposite direction relative to said cap means, spring means yieldably resisting said movement of the cap stem relative to said cap means, and means for moving said cap stem downwardly so as to pull said cap means downwardly on said spindle body to its expanded record supporting position when said primary record supporting means is withdrawn.

3. In a record changer spindle of the type having primary record supporting means which normally supports a stack of records on an upper storage portion of the spindle and which may be withdrawn to an inoperative position to release the lowermost record in the stack to a turntable for playing, the improvement comprising secondary record supporting means for supporting the remaining stack of records on the upper storage portion of the spindle when the primary record supporting means is withdrawn to release the lowermost record, said secondary record supporting means including, in combination, a body of said spindle having an upper end, cap means mounted over the upper end of said spindle body and vertically slidable thereon, said cap means having a lower end which is radially expandable for supporting a record on the upper storage portion of said spindle, sloping means associated with said spindle body for expanding said cap means to a record supporting position when the latter is moved downwardly on said spindle body, a cap stem having an upper end connected to said cap means so that the cap means moves downwardly with the cap stem, said cap stem being vertically movable a limited amount in an upward direction relative to said cap means, first spring means acting on said cap stem and said cap means for biasing said cap means toward an uppermost position relative to said cap stem and yieldably resisting movement of the cap stem in an upward direction relative to the cap means, and second spring means acting between said spindle body and said cap stem for biasing the latter downwardly so as to bias said cap means toward its lower operative position.

4. In a record changer spindle of the type having primary record supporting means which normally supports a stack of records on an upper storage portion of the spindle and which may be withdrawn to an inoperative position to release the lowermost record in the stack to a turntable for playing, the improvement comprising secondary means for supporting the remaining stack of records on the upper storage portion of the spindle when the primary supporting means is withdrawn to release the lowermost record, said secondary record supporting means including, in combination, a body of said spindle having a reduced diameter section at its upper end and an outwardly tapered section beneath said reduced diameter section, a thin-walled cap member mounted over the upper end of said spindle body and having a slotted lower end comprising a plurality of flexible gripping fingers which are radially expandable for supporting a record on the upper storage portion of said spindle, said cap member normally being positioned over said reduced diameter section of said spindle body but being movable downwardly to engage said flexible gripping fingers with said outwardly tapered spindle body section to expand said gripping fingers to a record supporting position, said cap member having an opening in its upper end, a cap stem having an upper end extending through said opening in the upper end of the cap member, a collar secured to said upper end of the cap stem overlying a surface of said upper end of the cap member about said opening such that the cap member moves downwardly with said cap stem and said cap stem is also vertically movable a limited amount in the opposite direction relative to said cap member, first spring means acting on said cap stem and said cap member for biasing said cap member toward an uppermost position relative to said cap stem so as to resist said relative movement between the cap stem and cap member, and second spring means acting between said spindle body and said cap stem for biasing the latter downwardly so as to bias said cap member toward its lower operative position.

5. In a record changer spindle of the type having primary record supporting means which normally supports a stack of records on an upper storage portion of the spindle and which may be withdrawn to an inoperative position to release the lowermost record in the stack to a turntable for playing, the improvement comprising secondary record supporting means for supporting the remaining stack of records on the upper storage portion of the spindle when the primary record supporting means is withdrawn to release the lowermost record, said secondary record supporting means including, in combination, a body of said spindle having a reduced diameter section at its upper end and an outwardly tapered section beneath said reduced diameter section, a thin-walled cap member mounted over the upper end of said spindle body and having a slotted lower end comprising a plurality of flexible gripping fingers which are radially expandable for supporting a record on the upper storage portion of said spindle, said flexible gripping fingers having enlarged wedging portions at their lower ends for engagement at the centerhole edge of a record to be gripped, said cap member normally being positioned over said reduced diameter section of said spindle body but being movable downwardly to engage said flexible gripping fingers with said outwardly tapered spindle body section to expand said gripping fingers to a record supporting position and wedge said enlarged wedging portions between said tapered spindle body section and the centerhole edge of a record to be gripped, a cap stem having an upper end and means connecting the upper end of the cap stem to the cap member such that the cap member moves downwardly with downward movement of the cap stem and is also movable a limited amount relative to said cap stem, first spring means acting on said cap stem and said cap member for biasing said cap member toward an uppermost position relative to said cap stem, and second spring means acting between said spindle body and said cap stem for biasing the latter downwardly so as to bias said cap member toward its lower operative position.

6. In a record changer spindle of the type having primary record supporting means which normally supports a stack of records on an upper storage portion of the spindle and which may be withdrawn to an inoperative position to release the lowermost record in the stack to a turntable for playing, the improvement comprising secondary record supporting means for supporting the remaining stack of records on the upper storage portion of the spindle when the primary record supporting means is withdrawn to release the lowermost record, said secondary record supporting means including, in combination, a body of said spindle having a plurality of circumferentially spaced vertical slots therein which define a plurality of spindle body segments, cap means mounted over the upper end of said spindle body and vertically slidable thereon, said cap means having a lower end which is radially expandable for supporting a record on the upper storage portion of said spindle, sloping means associated with said spindle body for expanding said cap means to a record supporting position when the latter is moved downwardly on said spindle body, a cap stem having an upper end connected to said cap and projecting downwardly therefrom into the upper end of said spindle body, the lower end of said cap stem having an enlarged head within said spindle body adjacent to said lower end of the cap means, said head being of a diameter only slightly less than the inner diameter of said spindle body so as to prevent the latter from collapsing radially under the force of the cap means when moved downwardly to effect radial expansion of the lower end of the cap means, and a compression spring having an upper end fixed relative to said spindle body and a lower end engaged against said cap stem head for biasing said cap stem downwardly so as to bias said cap means toward its lower operative position.

References Cited

UNITED STATES PATENTS

| | | | |
|---|---|---|---|
| 2,615,720 | 10/1952 | Miller et al. | 274—10 |
| 3,023,008 | 2/1962 | Ansar | 274—10 |
| 3,081,093 | 3/1963 | Tiedtke | 274—10 |
| 3,083,022 | 3/1963 | Hansen | 274—10 |
| 3,279,797 | 10/1966 | Goulding | 274—10 |

FOREIGN PATENTS

| | | |
|---|---|---|
| 1,093,106 | 11/1960 | Germany. |
| 1,170,667 | 5/1964 | Germany. |

LEONARD FORMAN, *Primary Examiner.*

J. M. FREED, *Assistant Examiner.*